Patented Oct. 23, 1945

2,387,388

UNITED STATES PATENT OFFICE 2,387,388

SHELLAC-POLYGLYCOL REACTION PRODUCTS AND METHOD OF MAKING SAME

William Howlett Gardner, Bayside, and Henry Hall Bassford, Jr., Brooklyn, N. Y., assignors to U. S. Shellac Importers Association, Inc., New York, N. Y., a corporation of New York No Drawing. Application May 28, 1942, Serial No. 444,923

8 Claims. (Cl. 260—104)

This invention relates to new compositions of matter prepared by reacting shellac with polyglycols and to the use of these compositions in aqueous paints and varnishes.

This application is a continuation in part of our copending case Serial No. 332,456, filed April 30, 1940.

Shellac and several other natural resins enjoy a variety of uses particularly in their alkaline aqueous solutions as hat binders, leather and shoe dressings, varnish for paper, floor waxes, inks, adhesives and the like.

The films obtained from these alkaline aqueous shellac solutions, however, have the disadvantage of being very brittle. There are but few plasticizers known today that are water-soluble and capable of addition to the aqueous shellac solution for the purpose of modifying the brittleness of the films. Even the water-soluble plasticizers, such as glycerine, for instance, but temporarily improve the flexibility of the films, and to a limited extent only.

Another weakness of films prepared using aqueous solutions of shellac and other binders, such as gelatine, glue, dextrine, starch and the like is their poor water resistance.

It is well known that shellac is insoluble in water and aqueous acids and that it is precipitated from its aqueous alkaline solutions by acids. In consequence, shellac can be used in neutral aqueous solution only in the form of its soaps and cannot be used at all in acid solutions having a pH less than 5 or in conjunction with other resin solutions which have a strong acid reaction. But acid solutions of modified shellac resins offer special promise for blending with other resins which require an acid setting agent.

Likewise, solutions of modified shellac resin in pure water should be useful for those cases in which it has been found undesirable to use alkaline solubilizing agents as for example:

Where the alkaline solution reacts with the vessel used for dissolving the shellac thus shortening the vessel's life and introducing undesirable impurities into the shellac solution; where the solution attacks the metal containers customarily used for packaging paints and varnishes; where the alkali used, adversely affects the surface coated or causes fading or running of essential dyestuffs or pigments.

An object, therefore, of our invention is the preparation of reaction products of shellac or shellac derivatives and polyglycols. The second object is the preparation of a modified shellac resin soluble in hydrocarbon solvents. The third object is the preparation of shellac derivatives which are soluble in water without the use of alkaline dispersing agents and which are not precipitated therefrom by either acids or alkalies. The fourth object is the preparation of aqueous solutions containing shellac polyglycol reaction products which shall yield permanently flexible films on evaporation.

The first object can be attained by heating shellac or a shellac derivative with a polyglycol of the formula:

$$H-(O-C_2H_4)_n-OH$$

where $n$ is an integer equal to or greater than 2, such as diethylene glycol ($n=2$), triethylene glycol ($n=3$), polyglycols of average molecular weight 400, (average value of $n=8.7$); MW 1500, ($n_{av} \approx 34$); MW 4000, ($n_{av} \approx 90$); either alone or in the presence of a condensation catalyst such as p-toluene sulfonic acid. Shellac as referred to above and elsewhere in this application includes all forms of lac, the secretion of the insect, Tachardia lacca Kerr, whether in raw, refined or manufactured forms. Shellac derivatives include the monomeric acids obtained by hydrolysis of shellac such as aleuritic and shellolic acids.

Alternatively the shellac or shellac derivative may first be heated with a polyhydric alcohol in accordance with the process described in our copending application, serial No. 332,456, describing "Flexible lac compositions" and the product obtained further reacted with a polyglycol. The second and third objects can be accomplished by condensing shellac or a shellac derivative with a polyglycol of molecular weight of about 1500 or more. The fourth object can be achieved by dissolving the product in water or if necessary in an aqueous solution containing a suitable organic or inorganic alkali to form an aqueous varnish. Aqueous paints and inks may be prepared by adding suitable pigments, extenders, toners, and the like to these varnishes.

Films on paper, metal, glass, cloth or other surfaces may be prepared using these varnishes and paints, by the usual processes of application such as brushing, spraying, dipping, etc. Detached films are readily obtained by flowing the paint or varnish onto a mercury surface, and allowing the film to dry. The dry film can then be lifted free of the mercury.

I have found that, in order to form a fusible, soluble product, the weight of polyglycol used should be at least 10% of the weight of the shellac because a lower proportion of polyglycol does not produce the desired results. Smaller proportions of polyglycol invariably result in the formation of an insoluble, infusible gel. No upper limit exists, however, for the weight of polyglycol which may be used in the reaction vessel, although the amount of polyglycol which can chemically combine with the shellac is limited by the number of reactive hydroxyl and carboxyl groups in the shellac molecules.

Proof that shellac reacts chemically with polyglycol 1500 is found by reference to Example III below. The reaction between the condensation components takes place rapidly at temperatures of 120° C. and above and is usually evidenced by the appearance of froth due to the water evolved by the reactions taking place.

Those products which are water insoluble are usually soluble in alkaline aqueous solutions containing ammonia, sodium carbonate, borax, sodium silicate, sodium phosphate, or aqueous solutions containing organic substances possessing a strong alkaline reaction such as morpholine, triethanolamine, ethylamine and the like. These water insoluble, alkali soluble products can be readily purified by filtering the aqueous alkaline solutions to remove wax, dirt and gelled material. The resin can then be precipitated by acidifying the solution, and the precipitate filtered and washed free of excess reactant and water soluble impurities.

It has been found that the products obtained by reacting shellac with polyglycols of high molecular weight are not only completely soluble in pure water but have the unique characteristic of also being completely soluble in benzene. They have therefore been found to possess excellent detergent and emulsifying properties. They can be readily blended in emulsion varnishes of the type described earlier in this application, and, due to their mutual solvent action on hydrocarbons and water, tend to stabilize the emulsion. Furthermore, by using materials of this type, clear varnishes containing water and hydrocarbon solvents can be prepared.

The following examples in which parts are given by weight, are illustrative of the instant invention without, however, limiting the same to any of the specific embodiments, amounts or conditions there recited.

Example I

Add 100 parts of dewaxed shellac gradually over a 30 minute period to 120 parts of a mixture of polyglycols, whose average molecular weight is about 400 (poly alkylene oxide #400), and which contain 1 part of p-toluene sulfonic acid catalyst. During the addition, agitate the reaction mixture vigorously and maintain the temperature between 150 and 155° C. After all the shellac has been added raise the temperature to 160° C. and stir the product at this temperature for approximately 15 minutes. The resulting product, although insoluble in water, should be readily soluble in dilute aqueous alkali and upon acidification of this solution the shellac-polyglycol product, free of excess polyglycols, (which are water soluble), should precipitate and may then be recovered by filtration.

Aqueous varnishes have been made by dissolving a shellac-polyglycol #400 product, made in this manner, in dilute aqueous ammonia. Films obtained by evaporation of this solution possessed good adhesion to paper, glass and metal, and those in paper and metal were much more flexible than corresponding films made using an ammonium solution of shellac. Moreover, these films remained flexible after standing several weeks whereas plasticized ammonium shellac film were no longer flexible after two weeks aging. Detached films prepared by evaporating a thin layer of the aqueous ammonia varnish on a mercury surface, floating or not floating as in the case of a mercurized metal plate employing copper for the plate or heated surface, were flexible and possessed moderate tensile strength and toughness when prepared from the shellac-polyglycol reaction product, but crumbled and fell to pieces when made from shellac.

Example II

In this example a modified shellac, (prepared by condensing seed-lac with a polyhydric alcohol in accordance with the process described in our copending application, Serial No. 332,456 describing "Flexible lac compositions") is reacted with a high molecular weight polyglycol. The modified shellac-polyhydric alcohol product is prepared as follows: 81 parts of ethylene glycol are heated to 120° C.; 0.5 part of p-toluene sulfonic acid are then added and 220 parts of seed lac are added gradually with good agitation as rapidly as it dissolves; the temperature is maintained throughout the addition between 120 and 150° C.; the addition requires about one-half hour; after 10 minutes additional heating and stirring the reaction is apparently complete as evidenced by cessation of foaming.

This modified shellac, without further treatment, is then added portionwise to 100 parts of polyglycol of average molecular weight 1500. The resulting mixture forms a uniform melt at 140° C. and said mixture is stirred and heated for one hour at 145–160° C.

The resulting product may then be dissolved in 800 cc. of water containing 30 parts of sodium carbonate and freed of wax and other impurities by filtration. The product is recovered from the alkaline filtrate by pouring into 350 parts of 5% aqueous acetic acid, whereupon the shellac reaction product precipitates as a gummy adherent resin which is recovered and washed by decantation.

Films yielded by the aqueous ammonia solution of the resin show improvement over comparable films obtained from ammoniacal solutions of both untreated and polyhydric alcohol modified shellac.

Example III 13 parts of dewaxed shellac are dissolved in 100 parts of polyglycol oxide which consists essentially of the polyglycols whose molecular weight is about 1500, (polyalkylene oxide 1500), 0.5 part p-toluene sulfonic acid added, and the mixture heated for 2½ hours between 180 and 200° C. The resulting product should be completely soluble in water.

A product prepared in this manner was found to be completely soluble in water, in strong and dilute aqueous hydrochloric acid, acetic acid and ammonium hydroxide. It was also readily soluble in many organic solvents such as acetone, dioxane, ethyl alcohol, benzene and chloroform.

Proof that chemical reaction has occurred between the shellac and polyglycol 1500 may be demonstrated by the following simple experiment in which it is shown that a physical mixture of shellac and the polyglycol is not completely water soluble.

13 parts of shellac are dissolved in 100 parts of polyglycol 1500 at a temperature of less than 100° C., and in the absence of catalyst. When this product is added to pure distilled water, a gummy resin separates which gradually hardens as the water extracts the polyglycol therefrom. The weight of dry, water-insoluble resin recovered is exactly equal to the weight of the shellac previously dissolved in the polyglycol. It is therefore evident from the above examples that when shellac and polyglycol 1500 are heated together at elevated temperatures in the presence of a catalyst, as described in the first paragraph of this Example III, a reaction takes place which converts the shellac to a new water soluble resin.

Having described our invention, what we claim and desire to secure by Letters Patent is as follows:

1. A water-soluble shellac product which is not precipitated by acids, obtained by reacting shellac with a polyglycol of average molecular weight of 1500, the polyglycol being at least 10% of the weight of the shellac.

2. A shellac product made by reacting about 220 parts of shellac and at least 80 parts of ethylene glycol at a temperature of approximately 120–150° C., and further reacting said product with about 100 parts of a polyglycol of a molecular weight of approximately 1500, at a temperature of approximately 150–160° C.

3. A shellac product made by reacting shellac and a polyglycol of a molecular weight of approximately 1500, at a temperature of approximately 180–200° C. the polyglycol being at least 10% of the weight of the shellac.

4. A shellac product made by reacting about 13 parts of dewaxed shellac with about 100 parts of a polyglycol of a molecular weight of approximately 1500 in the presence of a ctalyst, at a temperature of approximately 180–200° C.

5. A process for preparing a resin soluble in aqueous media which comprises heating a mixture comprising about 220 parts of shellac and about 80 parts of ethylene glycol, at a temperature of approximately 120–150° C., and further reacting the said product with about 100 parts of a polyglycol having a molecular weight of about 1500, at a temperature of 145–160° C.

6. A method of preparing a resin which is not precipitated by acids, which comprises a reacting shellac with a polyglycol of a molecular weight of about 1500 at a temperature of approximately 180–200° C. the polyglycol being at least 10% of the weight of the shellac.

7. A method of preparing a resin which is not precipitated by acids, which comprises reacting about 13 parts of dewaxed shellac with about 100 parts of a polyglycol having a molecular weight of about 1500.

8. A method of preparing a resin which is not precipitated by acids, which comprises reacting about 13 parts of dewaxed shellac with about 100 parts of a polyglycol having a molecular weight of about 1500, at a temperature of approximately 180–200° C.

WILLIAM HOWLETT GARDNER.
HENRY HALL BASSFORD, JR.